US009809770B2

(12) United States Patent
Xu et al.

(10) Patent No.: US 9,809,770 B2
(45) Date of Patent: Nov. 7, 2017

(54) METHOD FOR PREPARING HYDROGEN-RICH GAS BY GASIFICATION OF SOLID ORGANIC SUBSTANCE AND STEAM

(71) Applicants: ECO ENVIRONMENTAL ENERGY RESEARCH INSTITUTE LIMITED, Hong Kong (CN); DALIAN UNIVERSITY OF TECHNOLOGY, Dalian (CN)

(72) Inventors: Shaoping Xu, Dalian (CN); Yahui Xiao, Dalian (CN); Chao Wang, Dalian (CN); Guangyong Wang, Dalian (CN); Tursun Yalkunjan, Dalian (CN); Kam Shing Siu, Hong Kong (CN); Bin Xu, Hong Kong (CN); Hiu Ying Connie Chow, Hong Kong (CN)

(73) Assignees: ECO ENVIRONMENTAL ENERGY RESEARCH INSTITUTE LIMITED, Hong Kong (CN); DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 14/907,528

(22) PCT Filed: Jul. 25, 2014

(86) PCT No.: PCT/CN2014/000705
§ 371 (c)(1),
(2) Date: Jan. 25, 2016

(87) PCT Pub. No.: WO2015/010448
PCT Pub. Date: Jan. 29, 2015

(65) Prior Publication Data
US 2016/0186079 A1 Jun. 30, 2016

(30) Foreign Application Priority Data
Jul. 25, 2013 (CN) .......................... 2013 1 0316605

(51) Int. Cl.
*C10J 3/84* (2006.01)
*C10J 3/66* (2006.01)
(Continued)

(52) U.S. Cl.
CPC ................. *C10J 3/66* (2013.01); *C10B 49/18* (2013.01); *C10B 53/02* (2013.01); *C10B 57/06* (2013.01);
(Continued)

(58) Field of Classification Search
CPC ........ C10J 2300/0993; C10J 2300/0943; C10J 2300/1618; C10J 2300/092;
(Continued)

(56) References Cited

U.S. PATENT DOCUMENTS 3,034,979 A 5/1962 Nevens
4,106,999 A 8/1978 Koppelman et al.
(Continued)

FOREIGN PATENT DOCUMENTS

CA 2 314 094 A1 6/1999
CN 101139532 A 3/2008
(Continued)

OTHER PUBLICATIONS

International Search Report of the international searching authority for co-pending PCT application No. PCT/CN2014/000705 mailed Nov. 4, 2014.
(Continued)

*Primary Examiner* — Anthony J Zimmer
*Assistant Examiner* — Syed Iqbal
(74) *Attorney, Agent, or Firm* — Baker & McKenzie LLP

(57) ABSTRACT

The present disclosure provides a method for preparing hydrogen-rich gas by solid organics. For example, solid organic raw materials are heated in a pyrolysis reaction device to perform pyrolysis reaction, and gaseous product
(Continued)

generated from the pyrolysis reaction performs gasification with steam in a moving bed gasification reaction device to generate hydrogen-rich product. The present disclosure also provides a system for preparing hydrogen-rich gas by solid organics, and the system may include a solid heat carrier grading-dedusting device; a pyrolysis reaction device; a moving bed gasification reaction device; and a riser and combustion reactor. The present disclosure may operate at atmospheric pressure, and the technology is simple and suitable for the gasification and co-gasification of various high-volatile solid organics, such as raw materials containing a relatively large amount of moisture, mineral substance, and sulfur content.

43 Claims, 3 Drawing Sheets

(51) Int. Cl.
| | | |
|---|---|---|
| *C10K 3/02* | (2006.01) | |
| *C10B 49/18* | (2006.01) | |
| *C10B 53/02* | (2006.01) | |
| *C10B 57/06* | (2006.01) | |
| *C10J 3/58* | (2006.01) | |

(52) U.S. Cl.
CPC .............. *C10J 3/58* (2013.01); *C10K 3/023* (2013.01); *C10J 3/84* (2013.01); *C10J 2200/06* (2013.01); *C10J 2300/092* (2013.01); *C10J 2300/093* (2013.01); *C10J 2300/0916* (2013.01); *C10J 2300/0943* (2013.01); *C10J 2300/0946* (2013.01); *C10J 2300/0976* (2013.01); *C10J 2300/0993* (2013.01); *C10J 2300/1618* (2013.01); *C10J 2300/1807* (2013.01); *C10J 2300/1853* (2013.01); *C10J 2300/1861* (2013.01); *Y02E 50/14* (2013.01)

(58) Field of Classification Search
CPC ........ C10J 2300/1807; C10J 2300/1861; C10J 3/84; C10J 3/66; C10J 2200/06; C10J 2300/0916; C10J 2300/1853; C10J 3/58; C10J 2300/0976; C10J 2300/094; C10K 3/023

See application file for complete search history.

(56) References Cited

U.S. PATENT DOCUMENTS

| | | |
|---|---|---|
| 7,077,878 B1 | 7/2006 | Muhlen et al. |
| 8,764,856 B2 | 7/2014 | Xu et al. |
| 2010/0119440 A1 | 5/2010 | Muehlen |
| 2010/0162625 A1* | 7/2010 | Mills .................. C10J 3/485 48/76 |

FOREIGN PATENT DOCUMENTS

| | | | |
|---|---|---|---|
| CN | 101045524 B | * | 5/2010 |
| CN | 102010759 A | | 4/2011 |
| CN | 102433165 A | | 5/2012 |
| CN | 103468322 A | | 12/2013 |
| DE | 197 55 693 C1 | | 7/1999 |
| DE | 199 45 771 C1 | | 2/2001 |
| DE | 10 2007 005799 A1 | | 4/2008 |
| EP | 2 597 137 A1 | | 5/2013 |
| JP | 2008179802 A | | 8/2008 |

OTHER PUBLICATIONS

Extended European Search Report, European Application No. 14829656.9, date of mailing Dec. 21, 2016, 10 pages.

* cited by examiner

METHOD FOR PREPARING HYDROGEN-RICH GAS BY GASIFICATION OF SOLID ORGANIC SUBSTANCE AND STEAM

CROSS-REFERENCE TO RELATED APPLICATION

This application claims priority to PCT Application No. PCT/CN2014/000705 filed Jul. 25, 2014. This application also claims priority to PRC Application No. 201310316605.7 filed Jul. 25, 2013. The contents of all of the above are hereby incorporated in their entirety by reference.

TECHNICAL FIELD

The present disclosure pertains to the field of energy and chemical industry. It relates to, for example, a method for preparing hydrogen-rich gas through steam gasification of solid organic raw materials and their mixture, by using circulated solid heat carrier as heating medium, catalyst, and filter material for filtering and removing dust simultaneously.

BACKGROUND

It is an ideal model to prepare hydrogen-rich gas through steam gasification of solid organics. In order to achieve this, at least two problems need to be solved: providing heat required by steam gasification, and eliminating or decreasing tar in product gas.

Chinese Patent for Invention No. ZL200610113063.3 appears to disclose a decoupling fluidized bed gasification method and device. There, a fluidized bed reactor is divided into two interconnected rooms, in which one room is mainly used for drying and pyrolysis of solid fuel, and the other is used for semicoke-gasification and modification of tar and hydrocarbon. Heat required by pyrolysis and gasification is provided via combustion reaction of raw materials and semicoke with air or oxygen, which are fed into a same reaction space. The patent also provides a dual fluidized bed reaction device and method characterized by using the circulation of solid heat carrier, wherein the heat required by pyrolysis and gasification is partly provided by the combustion of unreacted semicoke in another fluidized bed reactor. Due to the employment of inner combustion for supplying heat, the gasification product gas would comprise inert nitrogen unless employing pure oxygen gasification agent. The limitation of fluidized gasification reactor also lies in: low reaction temperature; short stay time, which causes the conversion of tar and hydrocarbon insufficient; and high dustiness of the product gas. In addition, part of raw materials is directly combusted to supply heat, and thus the hydrogen is mainly converted into water, rather than efficiently enters into hydrogen-rich product gas, which is unreasonable from the view of element utilization.

Austria Vienna University of Technology purportedly developed a biomass gasification process with Fast Internally Circulating Fluidized Bed (FICFB) (reference: http://www.ficfb.at/). The structure of FICFB gasification reactor mainly comprises two reaction spaces: bubbling fluidized bed pyrolysis-gasification zone and fluidized bed rising-combustion zone, and the solid heat carrier circulated within these two zones. The solid heat carrier is heated through combustion of semicoke in the combustion zone and is circulated back to the pyrolysis zone and gasification zone to supply heat required by steam gasification and pyrolysis of biomass in the pyrolysis zone and the gasification zone. Then the solid heat carrier is re-fed into the combustion zone to start the next cycle. The gases of the two zones are separated with each other, therefore, hydrogen-rich gas without nitrogen can be produced. Pyrolysis and gasification of FICFB technology are performed at a same reaction space, which is hard to achieve independent control over pyrolysis and gasification, and has limitation to the adaptability of different raw materials. Both the stay time of biomass pyrolysis volatile matter in fluidized bed gasification reactor and the contacting time of the volatile matter with solid heat carrier are short, which leads to insufficient conversion of tar and high tar content of product gas. Therefore, the improvement of gasification efficiency is restrained. Where biomass, young brown coal, etc. are used as raw materials, the generated gaseous product may have a large amount of dust due to the pulverization of the raw materials during pyrolysis gasification process. If the dust cannot be efficiently removed in hot condition, the dust and the tar in gaseous product may form viscous mixture in the following condensation-purification process, which affects normal operation of system.

Chinese Patent for Invention No. ZL200710011214.9 appears to provide a method that enables independent control over pyrolysis of solid fuel raw materials, further decomposition and conversion of tar and hydrocarbon in the gaseous product generated by pyrolysis, and supplying heat to the reactions by combusting the semicoke from pyrolysis. The method is achieved through the circulation of solid heat carrier within three tandem reactors, which are moving bed pyrolysis reactor, moving bed gasification reactor, and riser and combustion reactor. The reactions respectively performed within the three reactors are: pyrolysis of solid fuel raw materials, steam gasification of gaseous product (including tar and low-carbon hydrocarbon) generated by pyrolysis, and combustion of semicoke and re-heating and rising of solid heat carrier. The limitation of the method is that, since the pyrolysis reactor and gasification reactor are tandem connected, the solid heat carrier from the riser and combustion reactor passes through the pyrolysis reactor and gasification reactor in turn, and then loops back to the riser and combustion reactor; therefore, the running conditions of the pyrolysis reactor and gasification reactor restrict each other. The temperature of the solid heat carrier fed into the pyrolysis reactor fully depends on the reaction degree within the gasification reactor, and the kinds and quantity of solid heat carrier fed into the pyrolysis reactor and gasification reactor cannot be respectively and independently controlled either. Therefore, it may be hard to achieve the goal that both pyrolysis reactor and gasification reactor are running at their respective optimal running conditions.

SUMMARY

To address the above issues, the present disclosure provides a method and device for preparing hydrogen-rich gas through steam gasification of solid organics. By using the circulation of solid heat carrier, independent and optimized control of rapid pyrolysis of solid organic raw materials and catalytic steam-involved decomposition and conversion of tar and hydrocarbon within gaseous product generated by pyrolysis can be achieved.

Example Embodiments of the Present Disclosure

Disclosed is a method for preparing hydrogen-rich gas through steam gasification of solid organic raw materials, with which rapid pyrolysis of solid organic raw materials and catalyzing steam gasification of gaseous product generated by pyrolysis can be respectively achieved by using the circulation of solid heat carrier. Pyrolysis reaction device and moving bed gasification reaction device may be disposed in parallel. The pyrolysis reaction device has one pyrolysis reactor or at least two parallel pyrolysis reactors, and the moving bed gasification reaction device has one moving bed gasification reactor or at least two parallel moving bed gasification reactors, wherein each pyrolysis reactor corresponds with at least one moving bed gasification reactor, or each moving bed gasification reactor corresponds with at least one pyrolysis reactor; wherein the gaseous product from each of the pyrolysis reactors is fed into the corresponding moving bed gasification reactor. The pyrolysis reactor can be a moving bed pyrolysis reactor or a fluidized bed pyrolysis reactor.

A part of solid heat carrier is used as heating medium for heating solid organic raw materials to be reacted. The other part is used as heating medium for gasification, and at the same time, can also be used as catalyst for gasification and particle filter material for capturing dust entrained in the gaseous product of pyrolysis. In an example embodiment, the part of solid heat carrier with smaller average particle size is used as heating medium for heating solid organic raw materials to allow rapid pyrolysis of the raw materials in order to get solid product and gaseous product. The other part of solid heat carrier with larger average particle size is used as heating medium and for capturing dust entrained in the gaseous product generated from pyrolysis, and at the same time, is used as catalyst to enable the gasification between the gaseous product generated from pyrolysis and steam so as to decompose and convert tar and low-carbon hydrocarbon into hydrogen-rich gas. The two parts of solid heat carrier with low temperature, whose temperatures have been reduced due to the participation of pyrolysis and gasification process, join together to be heated and risen. The solid heat carrier with high temperature which has been heated is subjected to dust removal and particle gradation and is divided into two parts, after that, the two parts of high temperature solid heat carrier respectively having smaller and larger average particle size are respectively used for pyrolysis and gasification again to form a cycle.

Specifically, the pyrolysis operation includes: pyrolysis of solid organic raw materials is performed in pyrolysis reaction device. The solid organic raw materials is rapidly mixed with the high temperature solid heat carrier with smaller average particle size in the mixing section of pyrolysis reaction device, and is rapidly transferred to the reacting section of pyrolysis reaction device. During this process, the solid organic raw materials are rapidly heated to pyrolysis temperature, i.e., 400° C.-800° C. Decomposition reaction of the solid organic raw materials which have been heated to pyrolysis temperature occurs in the reacting section of pyrolysis reaction device to generate gaseous pyrolysis product (including tar steam and low-carbon hydrocarbon) and solid pyrolysis product, wherein the solid pyrolysis product has carbon residue. In addition, some components of the gaseous pyrolysis product further react, which is so-called secondary reaction, to generate carbon deposit attached on the particle of solid heat carrier. The mixture of solid pyrolysis product and low temperature solid heat carrier leaves pyrolysis reaction device through quantitative delivery valve under the effect of gravity, and is fed into riser and combustion reactor. The gaseous product generated from pyrolysis together with the steam fed into pyrolysis device is drawn out from pyrolysis reaction device and fed into moving bed gasification reaction device.

Example functions of pyrolysis operation are that: on the one hand, the volatilizable organic matter in solid organic raw materials can be fully converted into gaseous product which is then converted into hydrogen-rich gas through the steam gasification of the gaseous product during gasification operation; on the other hand, pyrolysis of solid organic raw materials generates moderate amount of carbon deposit and solid product with carbon residue.

In an example embodiment, the solid organic raw materials may be selected from biomass, polymeric solid waste, coal, petroleum coke, or combinations thereof. The biomass means herbage and woody plants comprised of cellulose, hemicellulose and lignin, for example, agricultural waste (e.g. straw, bagassa and rice hull), forestry waste (e.g. bark, core shell and wood chips) or energy crop (e.g. *miscanthus* and *pennisetum hydridum*), etc. In an example embodiment, the solid organics used as single raw material or used for mixed raw materials should have volatile matter in relatively high amount, e.g., between 20-70% (present in dry-ash-free basis mass fraction). The moisture upper limit of the raw materials should be appropriate for ensuring the raw materials to be smoothly transported into the mixing section of pyrolysis reaction device. The moisture of raw materials enters into moving bed gasification reaction device together with the gaseous product generated from pyrolysis, and participates in the catalyzing steam gasification of the gaseous product generated by pyrolysis. Therefore, moderate amount of moisture contained in the raw materials can reduce additional water amount.

In the pyrolysis operation, proper heating rate of the raw material and pyrolysis temperature are also required. These mainly depend on the composition and the particle size of raw materials, the particle size and temperature of solid heat carrier, and the mixing rate and ratio of solid heat carrier to raw materials. Under the condition that the composition of solid organic raw materials and the particle size and temperature of solid heat carrier are given, the temperature of pyrolysis reaction device can be adjusted through controlling the mixing ratio of solid heat carrier to raw materials, as such, the degree of pyrolysis of solid organic raw materials can be controlled. While pyrolysis reaction device runs in moving bed mode, in unit time, the mass ratio of the solid heat carrier fed into the pyrolysis reaction device to the solid organic raw material should be 2-7:1. According to the present disclosure, depending on practical situation, the specific ratio can be specifically chosen as 2:1, 3:1, 4:1, 5:1, 6:1 or 7:1, e.g., as 3-5:1. The temperature of pyrolysis reaction device should be controlled within the range from 400 to 800° C., e.g., from 500 to 700° C. The higher temperature of solid heat carrier is, the larger mass ratio of solid heat carrier to the solid organic raw material that fed into pyrolysis reaction device can be achieved. While pyrolysis reaction device runs in fluidized bed mode, in order to ensure that the solid organic raw materials can achieve required degree of pyrolysis, the mass ratio of solid heat carrier to solid organic raw materials should be increased, and the ratio can be as high as 40 or more. The smaller particle size of solid organic raw materials is advantageous for rapidly heating and decomposing. The proper upper limit of particle size of the solid organic raw materials of the invented method depends on whether the solid product of pyrolysis can be smoothly raised in riser and combustion reactor, and should be typically controlled below 8 mm. According to the specific experiment and analysis of the inventor of the present Application, based on practical situation, the particle size can be specifically chosen as 2 mm, 6 mm or 7.5 mm, and for example the particle size should be controlled below 3 mm.

Steam, which is one of the gasification raw materials, is fed from the lower portion of the solid material layer in pyrolysis reaction device. The benefits are: steam carrying gaseous pyrolysis product of solid organic raw materials quickly leaves pyrolysis reactor, which promotes the pyrolysis reaction and reduces the secondary reaction of gaseous product produced by pyrolysis so as to reduce the possibility of generating carbon deposit and carbon black. While pyrolysis reactor runs in fluidized bed mode, steam is used as fluidify medium and gaseous heat carrier at the same time. In order to ensure that pyrolysis reactor may get the required temperature, the temperature of overheated steam fed into pyrolysis reactor should be high enough, which is typically controlled above 300° C.; at the same time, the mixing ratio of solid heat carrier to solid organic raw materials fed into pyrolysis reactor should be properly increased, and small amount of oxygen can also be fed into pyrolysis reactor at the time of feeding steam if necessary.

The gasification operation includes: in moving bed gasification reaction device, through using the heat and the reaction surface provided by high temperature solid heat carrier, the tar and low-carbon hydrocarbon in gaseous product generated from pyrolysis in pyrolysis reaction device undergo further cracking reaction, and react with steam to generate hydrogen-rich gaseous product; at the same time, carbon deposit is normally formed on the surface of solid heat carrier. Hydrogen-rich gas product is collected through separating unreacted water and residual tar from the gaseous product by condensation-cooling device. While solid heat carrier having catalyst activity is employed, by the catalysis of the solid heat carrier, the cracking of tar and low-carbon hydrocarbon in gaseous pyrolysis product and the reaction with steam can be enhanced at a relatively low temperature. While gaseous product generated from pyrolysis flows through moving bed gasification reaction device, the dust entrained in the gaseous product is captured by solid heat carrier particle bed layer. The solid heat carrier with reduced temperature leaves gasification reaction device, and sent to riser and combustion reactor together with the captured dust.

The main function of gasification operation is to react tar and low-carbon hydrocarbon of gaseous product generated from pyrolysis with steam, which is to decompose and convert them into hydrogen-rich gas. The reaction is a strongly endothermic reaction, therefore basic conditions for ensuring the reaction taking place smoothly are high temperature, catalyst, and the efficient distribution and stay of reactant in catalyst bed layer. The temperature of moving bed gasification reaction device is normally controlled at 800~950° C. In specific condition, for example, while the target product is gaseous product with high hydrogen concentration and calcium oxide is employed as carbon dioxide adsorbent, the lower limit of the temperature of moving bed gasification reaction device can be low to 700° C. In the circumstance that the running condition of pyrolysis reaction device is given, the temperature of moving bed gasification reaction device can be adjusted by means of temperature and circulation rate of solid heat carrier fed into gasification reaction device.

The quantity of solid heat carrier fed into moving bed gasification reaction device can be determined according to the influence of the dust removing efficiency and carbon deposit situation of solid heat carrier on the catalyst efficiency of solid heat carrier which is used as catalyst. On the premise of ensuring reaction system energy balance, increasing circulation rate of solid heat carrier in gasification reaction device is advantageous for shortening the stay time, reducing carbon deposit on the solid heat carrier which is as catalyst so as to avoid permanent inactivation of catalyst due to excessive carbon deposit. Controlling proper circulation rate of solid heat carrier can avoid overlarge resistance of bed layer due to the capture of dust, while ensuring the dust removing efficiency of moving particle layer. In unit time, the mass ratio of solid heat carrier fed into moving bed gasification reaction device to those fed into pyrolysis reaction device should be controlled at 0.1-5. According to the present Application, based on practical situation, the ratio may be specifically chosen as 0.5, 1, 3 and 4.5, all of which can be achieved by the present disclosure.

In moving bed gasification reactor, the mixture of gaseous product generated from pyrolysis in the pyrolysis reaction device and the steam contacts with solid heat carrier particle moving layer in a contact mode. The contact mode may be selected from a group consisting of parallel current, counter current, radically cross current, or combinations of the above gas-solid contact and flow modes. When nickel-based or iron-based catalyst is used as the solid heat carrier, the gas-solid contact mode of counter current or radically cross current is advantageous for the self-reduction of catalyst (i.e. in reducing atmosphere, metallic oxide on the carrier is reduced to pure metal having catalyst activity) and improving the stay time for efficient reaction. In addition, radically-cross-current moving solid heat carrier particle bed layer also has many advantages: large contacting area of gas-solid phase in unit reactor volume, low flow rate at which gas passes through moving particle bed layer, decreased resistance and so on. Therefore, radically-cross-current moving solid heat carrier particle bed layer is the preferred for the method of the present disclosure. Employment of radically-cross-current moving bed gasification reactor can also efficiently capture the dust entrained in gaseous product of pyrolysis.

The heating and rising operations include: in the bottom of riser and combustion reactor, the mixture of the solid product generated from pyrolysis in pyrolysis reaction device and solid heat carrier attached with carbon deposit, together with the solid heat carrier attached with carbon deposit from moving bed gasification reaction device, is fluidized and raised by hot air. During the process of rising, the carbon residue of solid product and the carbon deposit on the surface of solid heat carrier are burnt to generate heat and flue gas. Solid heat carrier is heated by the generated heat to give a high temperature solid heat carrier. High temperature solid heat carrier and the generated dust-bearing hot flue gas enter into solid heat carrier grading-dedusting device.

The main function of riser and combustion reactor is to regenerate the solid heat carrier, which is used as heating medium, catalyst and moving-particle filter material, while solid heat carrier is raised by hot airflow. The mixture of low temperature solid heat carrier and solid product generated from pyrolysis which leaves pyrolysis reaction device is fed into the bottom of riser and combustion reactor; at the same time, low temperature solid heat carrier, which already captures dust and leaves moving bed gasification reactor, is also quantitatively transported here.

Congregated low temperature solid heat carrier together with solid product generated from pyrolysis is rapidly fluidized and raised by hot air. During the process of rising, the carbon residue of solid product and the carbon deposit on the surface of solid heat carrier are burnt, and solid heat carrier is heated by the generated heat. In order to enable the carbon residue of solid product (i.e. the combustibles in solid pyrolysis product) and carbon deposit on solid heat carrier to be burnt in riser and combustion reactor, the temperature of the air fed into the inlet of riser and combustion reactor should be higher than the flammable point of the carbon residue and carbon deposit in solid product; normally, the temperature is higher than 400° C. In order to ensure the regeneration of solid heat carrier that is used as heating medium to meet the heat requirement of pyrolysis reaction device and gasification reaction device, when the solid heat carrier leaves riser and combustion reactor, its temperature should be high enough, which should normally reach 800~1000° C., and the upper limit of the temperature should be lower than the melting temperature of the ash of solid product generated from pyrolysis. In order to ensure the regeneration of solid heat carrier which is used as catalyst, the carbon deposit on solid heat carrier has to be completely burnt. In order to achieve the objective, besides meeting the combustion conditions of riser and combustion reactor (such as temperature, oxygen concentration, stay time of solid heat carrier and so on), the quantity and type of carbon deposit attaching to solid heat carrier fed into riser and combustion reactor should also be controlled, for example, by controlling proper stay time of solid heat carrier in moving bed gasification reaction device. In the situation that the operation condition of riser and combustion reactor cannot meet the requirement for totally combusting the carbon deposit on solid heat carrier catalyst, a special carbon-burning regenerator should be disposed before pyrolysis reaction device and moving bed gasification reaction device, to make sure that the solid heat carrier catalyst has no carbon deposit attached when being circulated back to pyrolysis reaction device and moving bed gasification reaction device.

In the circumstance of fluidization and high temperature of riser and combustion reactor, solid heat carrier particle will be inevitably worn. Therefore, solid heat carrier particles with good high temperature mechanical strength should be employed, at the same time, solid heat carrier should be replenished in time through the replenishment solid heat carrier inlet disposed at riser and combustion reactor.

Auxiliary fuel may be added through the auxiliary fuel inlet, which is disposed at the bottom of riser and combustion reactor, to supplement heat through combustion thereof, if the solid product generated from pyrolysis of the solid organic raw materials has a low yield of carbon residue, such that the combustion of the carbon residue of the solid product in the riser and combustion reactor is not sufficient to provide desired heat of reaction system. Gas or liquid or solid fuel can be used as the auxiliary fuel. The auxiliary fuel fed from the bottom of riser and combustion reactor can also be used for igniting and starting operations of the reaction system To solve the problem that the solid product generated from pyrolysis of the solid organic raw material has a low yield of carbon residue, such that the combustion of the carbon residue of the solid product in the riser and combustion reactor is not sufficient to provide desired heat of reaction system, another efficient way is using co-gasification, i.e. some solid product generated from pyrolysis with a high yield of carbon residue (such as petroleum coke) are added into the solid organic raw materials to be fed into pyrolysis reaction device, to give a mixed raw materials. The solid product generated from pyrolysis of the mixed raw materials would have a high enough yield of carbon residue, such that the combustion of this solid product is able to provide heat desired for the reaction system. As compared with directly combusting auxiliary fuel in riser and combustion reactor, the advantage of this method is the hydrogen-rich compositions of the raw materials can be transported to the product during the process of co-pyrolysis, rather than directly combusted.

The dust removing and size grading operations for the solid heat carrier include: high temperature solid heat carrier which has been heated in the riser and combustion reactor, together with hot flue gas, enters into solid heat carrier grading-dedusting device, in which the solid heat carrier, which is used as moving particle filter material, is regenerated via dust removal. Based on the difference of flow rate of solid heat carrier entraining dust fed into the solid heat carrier grading-dedusting device, by using the difference in density, inertia force or centrifugal force, or the combination of two or three of them between solid particles with different sizes, the solid heat carrier can be separated from dust-bearing hot flue gas, and divided into two parts with smaller or larger average particle size each. After leaving the solid heat carrier grading-dedusting device, the dust-bearing hot flue gas is emitted after being subjected to dust removing and heat recycling. As heat medium, the two parts of solid heat carrier with smaller and large average particle size each are fed into pyrolysis reaction device and gasification reaction device respectively for a new round of operation, so as to form said cycle. The grading of solid heat carrier particle can also be achieved by the method of mechanical sieving.

The role of solid heat carrier particle grading is: as heating medium in pyrolysis reaction device, small particle solid heat carrier has larger specific surface area, and is easier to achieve rapidly mixing and heating with solid organic raw materials in a smaller mixing ratio, such that the organic matter in solid organic raw materials can be fully converted into gaseous product, and further into hydrogen-rich gas through steam gasification. As heating medium, catalyst and moving particle filter material in moving bed gasification reaction device, solid heat carrier particle with larger average particle size is advantageous for reducing the resistance when gaseous product generated from pyrolysis flows through solid heat carrier moving particle layer, and is advantageous for the gas-solid heterogeneous catalytic gasification being performed smoothly, and at the same time, capturing the dust entrained in the gaseous product generated from pyrolysis.

It can be seen that, the method of the disclosure includes two parallel circulations of solid heat carrier:

I. The circulation of solid heat carrier used for heating solid organic raw material to achieve rapid pyrolysis: While being separated from dust-bearing hot flue gas in solid heat carrier grading-dedusting device, high temperature solid heat carrier from riser and combustion reactor is divided into two parts according to the difference of average particle size. As a heating medium, solid heat carrier with smaller average particle size is mixed with solid organic raw materials in pyrolysis reaction device such that the solid organic raw materials are heated to be pyrolyzed. Afterwards, low temperature solid heat carrier, whose temperature is decreased due to providing heat for heating solid organic raw materials, is mixed with the solid heat carrier from gasification reaction device; the mixture is heated to a high temperature by riser and combustion reactor and raised to be fed into the solid heat carrier grading-dedusting device, to start another circulation.

II. The circulation of solid heat carrier used as heating medium, catalyst and moving particle filter material simultaneously: While being separated from dust-bearing hot flue gas in solid heat carrier grading-dedusting device, the high temperature solid heat carrier from the riser and combustion reactor is divided into two parts according to the difference of average particle size. Solid heat carrier with larger average particle size enters into moving bed gasification reaction device, and heats the gaseous product from pyrolysis reaction device to allow pyrolysis and catalytic steam gasification occur. At the same time, the dust entrained in gaseous product from pyrolysis reaction device is captured by solid heat carrier particle layer. Afterwards, the solid heat carrier with decreased temperature and captured dust enters into riser and combustion reactor, and is mixed with the solid heat carrier and the solid product from pyrolysis reaction device to give a mixture, and the mixture is then heated and raised. During the process of being heated and raised, carbon deposit on the surface of solid heat carrier is burnt, through which the solid heat carrier used as catalyst is regenerated. Afterwards, high temperature solid heat carrier goes back to solid heat carrier grading-dedusting device to start another circulation.

In an example embodiment, hard-burned olivine exhibits relatively good high temperature abrasion resistance, and has catalyst activity for steam gasification of tar and low-carbon hydrocarbon. Therefore, hard-burned olivine is the basic solid heat carrier for the present disclosure. Proper solid heat carriers for the present disclosure also include silica sand, corundum sand, calcined magnesite, high-temperature ceramic materials, mullite, zircon sand, iron sand, solid generated from pyrolysis of raw materials (i.e. the solid product generated from pyrolysis of raw materials can also be circularly used as solid heat carrier), or combinations of two or more of them In an example embodiment, the preferred embodiment of the solid heat carrier is a heat-resisting solid catalyst that has catalyst activity for steam-involved decomposition-conversion reaction of gaseous product generated from pyrolysis, which can be olive, or olivine-supported nickel-based catalyst, or olivine-supported iron-based catalyst, or nickel-based perovskite catalyst, or commercial nickel-based catalyst, or the combinations of them.

In an example embodiment, limestone or dolomite or calcite can be used together with the solid heat carrier to function as desulfurizer, carbon dioxide adsorbent and solid heat carrier. Not only is this advantageous for the steam-involved decomposition and conversion of tar and low-carbon hydrocarbon, but also advantageous for desulfurizing and improving the hydrogen content of gas product. Taking the case of limestone being added as an example, at the high temperature of riser and combustion reactor, limestone is decomposed to give calcium oxide. The calcium oxide, which is circulated back to pyrolysis reaction device, is not only used as heat carrier to provide the heat required by pyrolysis of solid organic, but also used as desulfurizer to react with the hydrogen sulfide generated from the process of pyrolysis, and bring the generated sulfur into the riser and combustion reactor, which may prevent the generated sulfur from entering into the moving bed gasification reaction device and further entering into gas product. The sulfur entering into moving bed gasification reaction device will make the nickel-based catalyst deactivated. The calcium oxide, which is circulated back to pyrolysis reaction device and moving bed gasification reaction device, can be used as carbon dioxide adsorbent to react with carbon dioxide entrained in gaseous pyrolysis product to generate calcium carbonate. This reaction can promote the water gas conversion reaction, thereby improving the hydrogen content of product gas. At the same time, the reaction is an exothermic reaction, which is thus advantageous for improving the heat balance of the reaction system. However, when being performed at atmospheric pressure and relatively low temperature, the reaction is efficient in thermodynamics. Therefore, the reaction mainly occurs in pyrolysis reaction device with relatively low temperature. In order to promote the reaction occurring in moving bed gasification reaction device, the temperature of moving bed gasification reaction device should be controlled at a relatively low temperature, for example, 700-750° C.

The upper limit of particle of the foregoing solid heat carrier is determined depending on whether it can be smoothly raised in riser and combustion reactor. Normally, the upper limit of particle of the foregoing solid heat carrier is controlled below 6 mm.

In an example embodiment, the operation pressure of each reactor is atmospheric pressure; the temperature of pyrolysis reaction device is 400~800° C., the temperature of moving bed gasification reaction device is 700~950° C., and the temperature of riser and combustion reactor is 800~1100° C.

The present disclosure also provides a system for preparing hydrogen-rich gas through steam gasification of solid organic raw materials. The system may comprise the following parts: solid heat carrier grading-dedusting device 1, pyrolysis reactor 2, moving bed gasification reactor 3, riser and combustion reactor 4, condensation-cooling system 5, and so on. For the circulations of solid heat carrier, pyrolysis reactor 2 and moving bed gasification reactor 3 are disposed in parallel. That is to say, after leaving solid heat carrier grading-dedusting device 1, a part of the solid heat carrier enters into pyrolysis reactor 2, and the other part enters into moving bed gasification reactor 3.

In the present disclosure, a pyrolysis reactor may be a moving bed pyrolysis reactor or a fluidized bed pyrolysis reactor. One riser and combustion reactor can be used in correspondence with a combination of one pyrolysis reactor and one moving bed gasification reactor, which are disposed in parallel, and the gaseous product generated from pyrolysis reaction is fed into moving bed gasification reactor. Regarding the mismatching between riser and combustion reactor and the combination of pyrolysis reactor and moving bed gasification reactor, specifically, the production capacity of riser and combustion reactor is relatively high, while the single reactor volume and processing capacity of both pyrolysis reactor and moving bed gasification reactor are relatively low, the following ways can be employed in the rapid pyrolysis method of the present disclosure to improve the production capacity of single system: one riser and combustion reactor is used in combination with two or more parallel pyrolysis reactors (e.g., FIG. 3 shows two pyrolysis reactors 21, 22 disposed in parallel), wherein the mixtures of steam and gaseous pyrolysis product entraining dust from all of the parallel pyrolysis reactors join together and are fed into a common moving bed gasification reactor. Or otherwise, one riser and combustion reactor is used in combination with a combination of two or more parallel pyrolysis reactors and two or more parallel moving bed gasification reactors, wherein each pyrolysis reactor corresponds to one or more moving bed gasification reactor, or each moving bed gasification reactor corresponds to one or more pyrolysis reactor, and the gaseous pyrolysis product generated from pyrolysis reactor is respectively fed into corresponding moving bed gasification reactor.

Solid heat carrier grading-dedusting device 1 has an inlet for feeding the mixture of solid heat carrier particle and flue gas entraining dust and an outlet for discharging dust-bearing flue gas at the upper portion, and a small particle solid heat carrier outlet and a large particle solid heat carrier outlet at the lower portion. The small and large particle solid heat carrier outlets respectively provide access to pyrolysis reactor 2 and moving bed gasification reactor 3 disposed under the solid heat carrier grading-dedusting device.

Moving bed pyrolysis reactor 2 includes two parts, which are built-in or pre-mixing section and reacting section. Solid organic raw materials and small particle solid heat carrier from solid heat carrier grading-dedusting device 1 respectively are fed into the mixing section of moving bed pyrolysis reactor, and then fed into the reacting section after being completely mixed. The moving bed pyrolysis reactor has an outlet at the bottom end, which is used for the feeding of the mixture of solid heat carrier and solid pyrolysis product into riser and combustion reactor 4. The moving bed pyrolysis reactor has a gaseous product outlet at the upper portion which is connected with moving bed gasification reactor 3 to provide an access for feeding the mixture of gaseous pyrolysis product and steam into moving bed gasification reactor. A steam inlet is also disposed at the bottom of moving bed pyrolysis reactor. Solid material level detecting and controlling mechanism is disposed at moving bed pyrolysis reactor, to keep the solid material level of pyrolysis reacting section below the outlet for discharging gaseous product generated from pyrolysis.

The upper inlet of moving bed gasification reactor 3 is connected with the large particle solid heat carrier outlet of solid heat carrier grading-dedusting device 1, and the lower outlet of the moving bed gasification reactor is connected with the bottom of riser and combustion reactor 4. An inlet for feeding the mixture of gaseous pyrolysis product entraining dust and steam and an outlet for discharging gas product of steam gasification are disposed on moving bed gasification reactor, and are respectively connected with moving bed pyrolysis reactor 2 and condensation-cooling system 5.

Riser and combustion reactor 4, at the bottom, is equipped with a hot air inlet, an inlet for the mixture of solid heat carrier from pyrolysis reactor and solid product, and an inlet for solid heat carrier from moving bed gasification reactor which already captures dust. An additional inlet for replenishing solid heat carrier and auxiliary fuel is disposed at the bottom of riser and combustion reactor. The upper outlet of riser and combustion reactor is connected with solid heat carrier grading-dedusting device.

Special carbon-burning regenerator 6 and 7 can be respectively disposed between the solid heat carrier grading-dedusting device 1 and the moving bed pyrolysis reactor 2, and between the solid heat carrier grading-dedusting device 1 and the moving bed gasification reactor 3. Moving bed reactor or fluidized bed reactor can be employed as the carbon-burning regenerator.

With the aid of the material sealing effect caused by solid heat carrier in the pipelines which connect adjacent reactors, the atmosphere in moving bed pyrolysis reactor and moving bed gasification reactor, the atmosphere in solid heat carrier grading-dedusting device located above, and the atmosphere of riser and combustion reactor located beneath are shut off from each other, and have no leakage to each other. Therefore, hydrogen-rich gas product nearly without nitrogen can be achieved.

The operation pressure of each of the foregoing reactors is atmospheric pressure.

As compared with the prior art, various technical features and technical effects may be achieved by disclosed systems and methods for preparing hydrogen-rich gas through steam gasification of solid organic raw materials.

For example, a method provided by the present disclosure includes two parallel solid heat carrier circulations each of which can be independently optimized and controlled, wherein the circulated solid heat carrier is divided into two parts with different average particle size each. The part with smaller particle size is used as heating medium to heat solid organic raw material, which is thereby rapidly pyrolyzed; and the other part with larger particle size is used as heating medium, catalyst and moving particle filter material for the catalytic steam gasification of gaseous product including tar and low-carbon hydrocarbon generated from pyrolysis and capturing dust entrained in gaseous product generated from pyrolysis.

With the aid of the circulation of a solid heat carrier, a riser and combustion reactor can be tandem connected with parallel moving bed pyrolysis reactor and moving bed gasification reactor, respectively, so as to combine the three into one gasification system. The method achieves the respective independent control over (1) pyrolysis of solid organic raw material, (2) steam-involved decomposition and conversion (also known as gasification) of the gaseous product (including tar and hydrocarbon gas) generated from pyrolysis, and (3) independent control of combustion reaction of solid product generated from pyrolysis which provides the required heat for pyrolysis of raw material and the steam-involved decomposition and conversion of pyrolysis gas product. The method features normal-pressure operation and a simple process, and thus is suitable for the gasification and co-gasification of various high-volatile solid organics such as raw materials containing a relatively large amount of moisture, mineral substance, and sulfur.

A circulated solid heat carrier is subjected to size grading and allocated to moving bed pyrolysis reactor and moving bed gasification reactor which are disposed in parallel, with which the optimization of running conditions of both moving bed pyrolysis reactor and moving bed gasification reactor can be achieved. That is, the solid heat carrier with small particle sizes is applied to pyrolysis reactor to achieve rapid pyrolysis of raw materials. Meanwhile, the solid heat carrier with larger particle sizes is applied to moving bed gasification reactor, which allows the moving bed gasification reactor to have smaller bed layer resistance, and therefore achieve more efficient decomposition and conversion of tar and low-carbon hydrocarbon and hot dust-removing, on the premise of suitable catalyzing gasification effect. As such, the conversion of the organic substances in solid organic raw material into hydrogen-rich gas—a clean target product—can be maximized.

By using high volatile raw materials in combination with raw materials that achieve relatively high yield of solid product generated from pyrolysis which has high carbon content, i.e. using a co-gasification method, a solid product with desired quantity and carbon residue content can be generated from pyrolysis. The reaction system can be provided with heat required through the combustion of said solid product, such that energy balance of reaction system can be achieved without externally-provided heat. Since there is no need to combust solid organic raw materials directly for heat supply, an oriented transfer of hydrogen from raw materials to the product, hydrogen-rich gas, can be maximized.

After being connected in parallel, multiple moving bed pyrolysis reactors and corresponding moving bed gasification reactors may be connected with a riser and combustion reactor in tandem. By doing so, production capacity of the

DETAILED DESCRIPTION

Example embodiments of the present disclosure are further illustrated below by referring to the Figures and specific embodiments.

Figure 1:
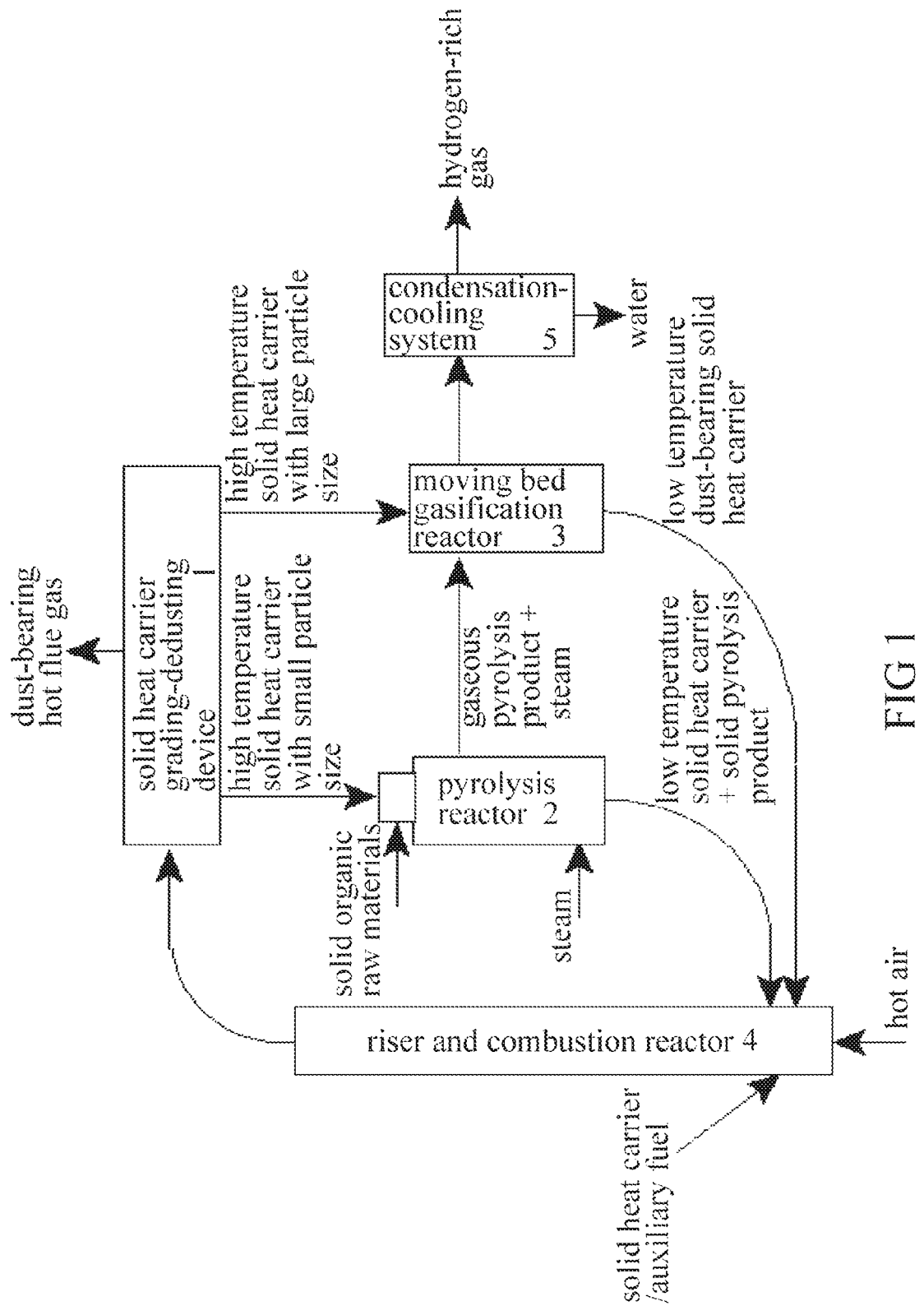
FIG. 1 is a schematic diagram showing an example method provided by the present disclosure for preparing hydrogen-rich gas through steam gasification of solid organic raw materials.
Figure 2:
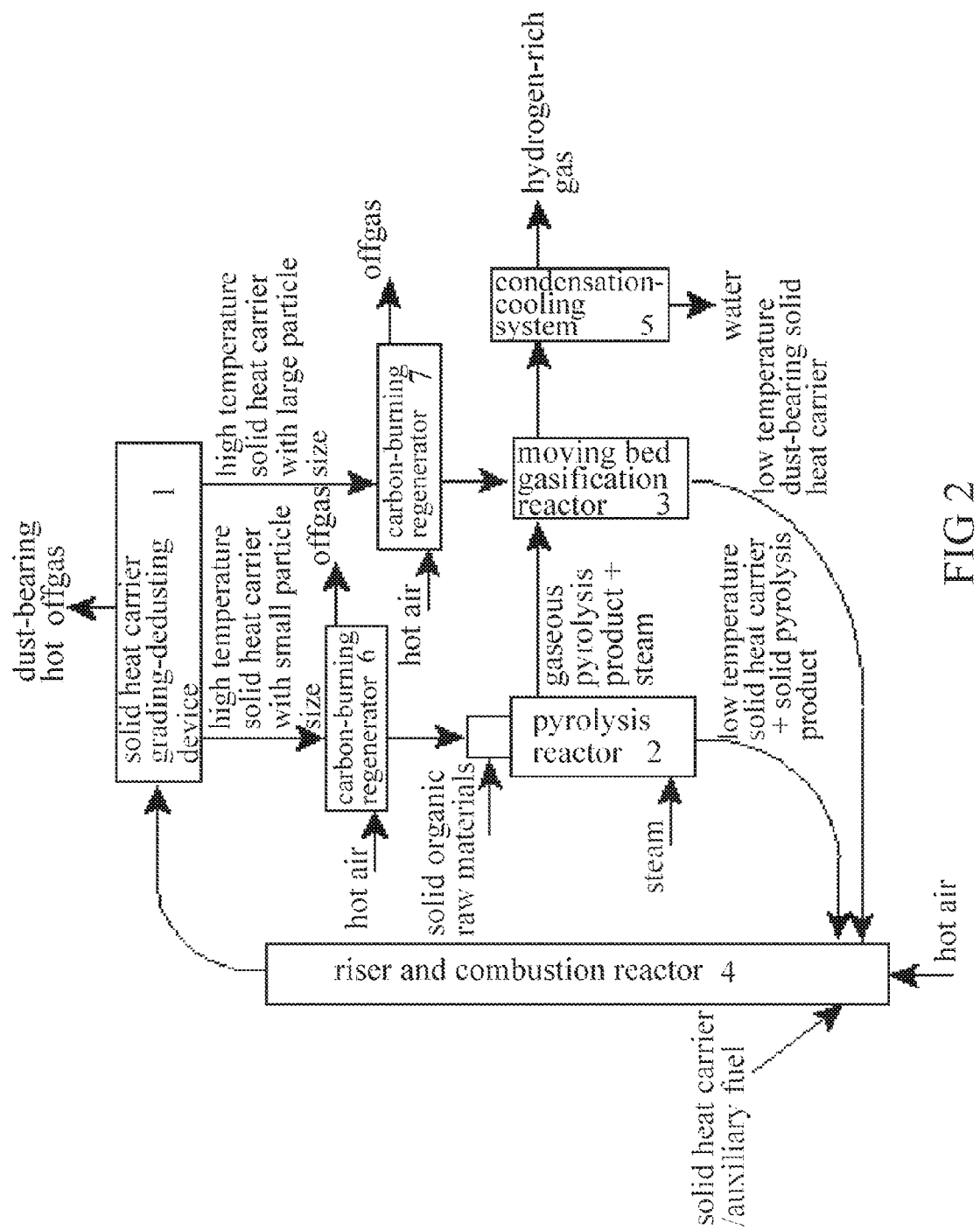
FIG. 2 is a schematic diagram showing an example method provided by the present disclosure for preparing hydrogen-rich gas through steam gasification of solid organic raw materials (including carbon-burning regenerator)

The rapid co-gasification of white pine chips and lignite is performed in the experiment system with a processing scale of 1 kg/h, and the operating principle of this experiment system is the same with that shown in FIG. 1. The air-dry basis moisture, air-dry basis volatile matter and particle size of the first raw material white pine chips and the second raw material lignite are respectively 5.0%, 77.7%, less than 2 mm and 27.9%, 35.1%, less than 1.2 mm. Before the experiment, raw materials are dried for 3 hours at temperature of 105~110° C. in oven. Olivine or olivine-supported nickel-based catalyst particles with particle size of 0.2~1.2 mm is employed as circulated solid heat carrier.

After drying, the white pine chips and lignite are respectively fed into a secondary screw feeder at fixed or fixable quantities from each raw materials storage tank via corresponding primary screw feeders; both of the two materials are fed in a feeding rate of 250 g/h. The mixture of white pine chips and lignite is rapidly transported and fed from the secondary screw feeder to an internally disposed stirring mixer which locates at the upper portion of moving bed pyrolysis reactor 2. Afterwards, the mixture is rapidly mixed with high temperature circulated solid heat carrier from solid heat carrier grading-dedusting device 1, the most probable particle size of which is about 0.5 mm, and rapidly falls into reacting section which locates at the lower portion of moving bed pyrolysis reactor 2 to perform pyrolysis reaction.

Solid material level of moving bed pyrolysis reactor 2 is measured with an impeding level probe. The flow of solid heat carrier fed into pyrolysis reactor is controlled by a valve which connects solid heat carrier grading-dedusting device 1 and moving bed pyrolysis reactor 2; the flow of the mixture of solid heat carrier which leaves the pyrolysis reactor and solid product generated from pyrolysis is controlled by a valve configured at the pipeline which connects pyrolysis reactor 2 and the bottom of riser and combustion reactor 4; through the cooperation of the foregoing two valves, the solid material level of pyrolysis reactor can be controlled around 20 mm below the pyrolysis gas outlet.

An overheated steam inlet is disposed at the lower portion of moving bed pyrolysis reactor 2. The overheated steam fed into moving bed pyrolysis reactor 2 with overheat temperature of 450° C. passes through the layer comprising solid heat carrier and solid product generated from pyrolysis, and goes upwards. During this process, the steam is further heated by solid product generated from pyrolysis and solid heat carrier, and at the same time, the gaseous product generated from pyrolysis is carried by and leaves solid material lay of moving bed pyrolysis reactor together with the steam.

The gaseous product of pyrolysis of raw materials in moving bed pyrolysis reactor is fed to moving bed gasification reactor 3 under the pumping effect of a vacuum pump which is disposed downstream of condensation-cooling system 5. The mixture of solid product generated from pyrolysis of raw materials in pyrolysis reactor 2 and solid heat carrier is quantitatively fed to the mixing and pre-fluidizing section at the bottom of riser and combustion reactor 4 through pipeline valve under the effect of gravity.

Moving bed gasification reactor 3 is a radial moving bed, within which a circinate moving solid heat carrier particle layer passage—which is formed by surrounding internal net and external net—may be disposed. A central distributing gas passage is inside the internal net, and a joining gas passage is between external net and the outer wall of moving bed gasification reactor 3. High temperature circulated solid heat carrier from solid heat carrier grading-dedusting device 1 with the most probable particle size of about 0.7 mm continuously flows through circinate moving particle layer passage, the flow quantity and stay time of which can be controlled by the pipeline valve which connects moving bed gasification reactor 3 and the bottom of riser and combustion reactor 4. Gaseous product generated from pyrolysis enters into the central distributing gas passage of moving bed gasification reactor 3 from the upper portion thereof. After passing through the circinate solid heat carrier moving particle layer in cross current mode, the gaseous product is gathered at the joining gas passage and fed into condensation-cooling system 5 through the gas outlet pipeline which locates at the upper portion of moving bed reactor 3.

Condensation-cooling system 5 may operate in a mode of indirect condensation-cooling, and may include two sections of circulated ice water condenser and two sections of circulated low temperature ethanediol (−10° C.) cooler in tandem. The hot gas from moving bed gasification reactor 3 flows through the foregoing four sections of condensation-cooling reactor, wherein the condensable matter (water and little amount of tar) is condensed and collected in the liquid storage tank at the bottom of each section of condensation-cooling reactor. After cooling, the gas is fed into a filter filled with degreasing cotton to capture the residual tar fog or aerogel. Then, the gas is fed to gasometer through vacuum pump.

Figure 3:
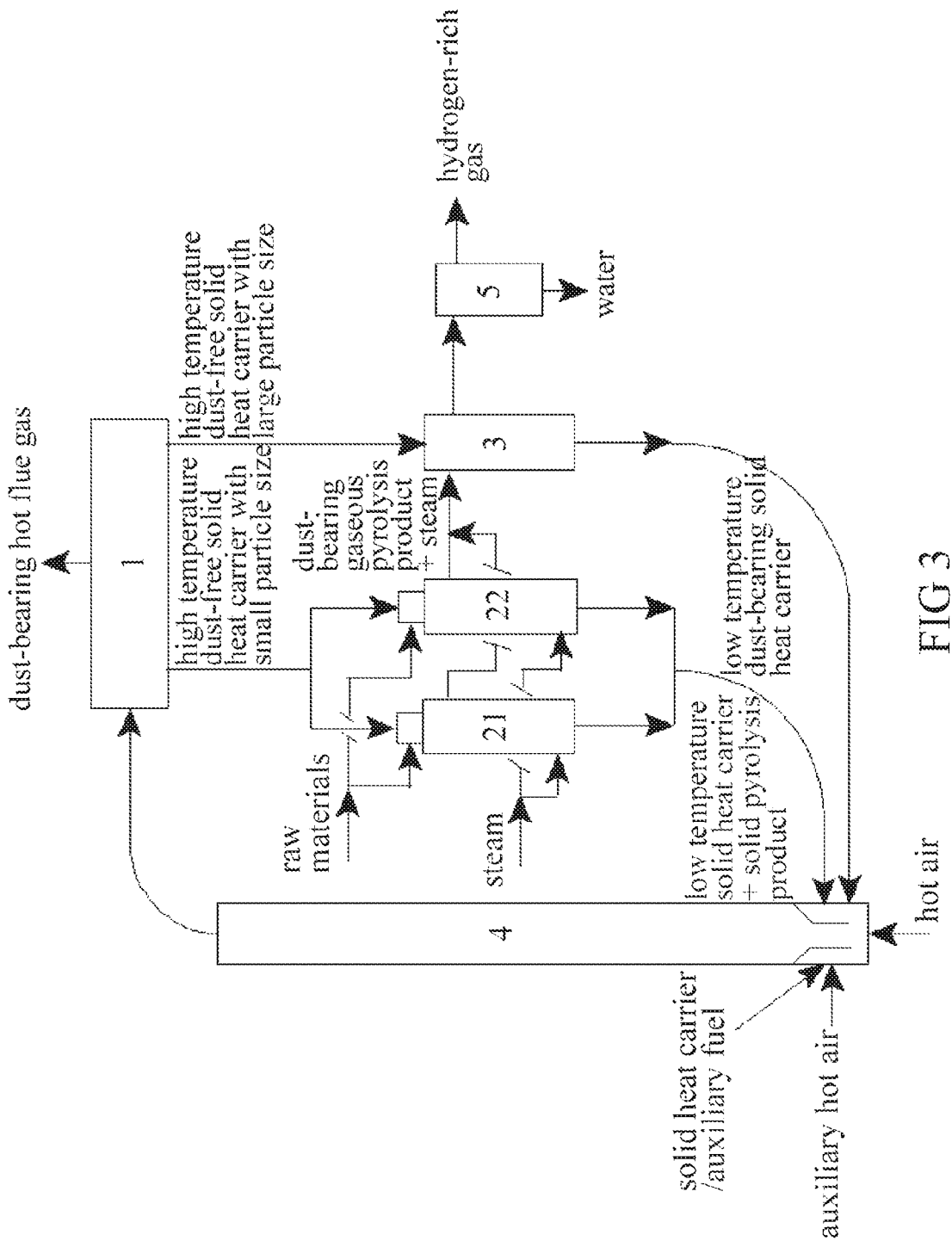
FIG. 3 is a schematic diagram showing an example system having parallel moving bed pyrolysis reactors and used for implementing methods of the present disclosure for preparing hydrogen-rich gas through steam gasification of solid organic raw materials.

The mixture of solid heat carrier from moving bed pyrolysis reactor 2 and the solid product generated from pyrolysis joins with the solid heat carrier from moving bed gasification reactor 3 at the pre-fluidizing section at the bottom of riser and combustion reactor 4. The structure schematic diagram of the pre-fluidizing section at the bottom of riser and combustion reactor 4 is shown in FIG. 3. Besides the main function of rising air, a second air inlet is disposed to assist the pre-fluidization of solid material.

The temperature of the hot air fed into the bottom of riser and combustion reactor 4 may be controlled (e.g., at about 400° C.). During the rising process of the mixture of solid heat carrier and solid product generated from pyrolysis by hot air, carbon residue on the solid product generated from pyrolysis and carbon deposit attached to solid heat carrier are fully combusted, and at the same time, the solid heat carrier is heated. Afterwards, high temperature solid heat carrier together with flue gas dust-bearing hot flue gas leaves from the upper portion of riser and combustion reactor 4, and is fed into solid heat carrier grading-dedusting device 1.

Solid heat carrier grading-dedusting device 1 comprises internal and external cylinders which are cone-shaped at the bottom, and each of which has a solid heat carrier outlet at the bottom end thereof. The solid heat carrier outlets respectively lead to moving bed pyrolysis reactor 2 and moving bed gasification reactor 3. The internal cylinder has a height of about ⅓-⅔ of the height of the external cylinder, and is open at the top end. The top end of the external cylinder is closed, and has an outlet for dust-bearing hot flue gas disposed at the central portion thereof. An inlet for the mixture of hot flue gas and high temperature solid heat carrier is in the horizontal tangent direction of the external cylinder inner wall at the top of solid heat carrier grading-dedusting device 1.

After the entering of hot flue gas carrying high temperature solid heat carrier along the tangent direction from riser and combustion reactor 4 into solid heat carrier grading-dedusting device 1, under the effect of inertia force and centrifugal force, the solid heat carrier with larger average particle size mainly falls into the cone-shaped section at the bottom of external cylinder, and the solid heat carrier with smaller average particle size mainly falls into the cone-shaped section at the bottom of internal cylinder, while fine dust together with hot flue gas leaves from the hot flue gas outlet at the top end and is emitted after further dust-removing and cooling.

Table 1 shows the results of two experiments, which employ 900° C. calcined olivine and calcained olivine-supported nickel catalyst (mass fraction of NiO is 5%) as circulated solid heat carrier, respectively, and white pine chips and lignite are continuously fed for 3 hours. Other experiment conditions are: circulating rate of solid heat carrier passing through moving bed pyrolysis reactor is 2 kg/h; circulating rate of solid heat carrier passing through radial moving bed gasification reactor is 3 kg/h; the temperature of riser and combustion reactor is 870° C.; the temperature of solid heat carrier grading-dedusting device is 870° C.; the temperature of moving bed pyrolysis reactor is 600° C.; the temperature of radial moving bed gasification reactor is 850° C.; mass ratio of steam/(lignite+white pine chips) is 0.64. After being collected by gasometer, hydrogen-rich gas product is subjected to composition and content analysis with gas chromatography. The method for analyzing liquid product is shown below: after the experiment, tetrahydrofuran (THF) is employed to wash the condensation-cooling system and collects liquid product. The collected liquid mixture (water+tar+THF) is evaporated by rotary evaporator at 40° C. and reduced pressure, which is to remove THF to get the mixture of tar and water; ethyl acetate is employed to extract tar, and the mixture of ethyl acetate and tar is evaporated by rotary evaporator at 45° C. and reduced pressure, which is to remove ethyl acetate to get tar, and then the quantity of tar and water is measured and calculated.

Experiment results show that, as compared with calcined olivine, as circulated solid heat carrier, calcined olivine-supported nickel catalyst exhibits relatively high activity in tar removal and methane reforming of gaseous product, and the gas yield and the content of $H_2$ and CO of the product gas are improved, wherein the decomposition-removal rate of tar and the conversion rate of methane are respectively 94.4% and 98.2%. Within the collected liquid product, no significant amount of dust is detected.

TABLE 1 gasification ability comparison of different solid heat carrier catalysts

| Solid heat carrier | Olivine-supported nickel | Olivine |
|---|---|---|
| Gas composition (vol. %) | | |
| $H_2$ | 46.0 | 38.0 |
| CO | 25.0 | 15.3 |
| $CO_2$ | 28.7 | 33.8 |
| $CH_4$ | 0.2 | 11.9 |
| Hydrogen-rich gas yield | | |
| ($Nm^3$/kg daf.) | 1.39 | 0.89 |
| Tar content in product gas | | |
| (g/$Nm^3$) | 0.44 | 7.89 |

What is claimed is:

1. A method for preparing hydrogen-rich gas from solid organics, the method comprising:
   heating solid organic raw materials in a pyrolysis reaction device for pyrolytic formation of a gaseous product and steam; and
   performing gasification of the gaseous product and steam in a moving bed gasification reaction device to generate hydrogen-rich gas, in which the gaseous product is generated from pyrolysis;
   wherein the pyrolysis reaction device is in parallel with the moving bed gasification reaction device, wherein, by passing through a solid heat carrier grading-dedusting device, the solid heat carrier is divided into two parts that are fed into the pyrolysis reaction device and moving bed gasification reaction device, respectively, wherein, when leaving the pyrolysis reaction device and moving bed gasification reaction device, the two parts of solid heat carrier are fed into a riser and combustion reactor to be heated and raised, and are then passed into the solid heat carrier grading-dedusting device to be further divided into two parts, wherein the two further-divided parts are then fed into the pyrolysis reaction device and the moving bed gasification reaction device, respectively, again to create a cycle;
   wherein the part of the solid heat carrier that is fed into the pyrolysis reaction device is used as a heating medium for the pyrolysis, and the other part of the solid heat carrier that is fed into the moving bed gasification reaction device is used as a heating medium for the gasification.

2. The method according to claim 1, wherein the solid heat carrier grading-dedusting device divides the solid heat carrier into two parts based on the average particle size, wherein the part with smaller average particle size is fed into the pyrolysis reaction device, and the other part with larger average particle size is fed into the moving bed gasification reaction device.

3. The method according to claim 1, wherein the solid organic raw materials is selected from biomass, polymeric solid waste, coal, petroleum coke or combinations of two or more of them.

4. The method according to claim 3, wherein the biomass comprises components of cellulose, hemicellulose, lignin and the like, which comprises agricultural waste, forestry waste, or energy crop, or combinations thereof.

5. The method according to claim 1, wherein the pyrolysis reaction device comprises one pyrolysis reactor or at least two parallel pyrolysis reactors, wherein the moving bed gasification reaction device comprises one moving bed gasification reactor or at least two parallel moving bed gasification reactors;
wherein each pyrolysis reactor corresponds with at least one moving bed gasification reactor, or each moving bed gasification reactor corresponds with at least one pyrolysis reactor; wherein the gaseous product from each of the pyrolysis reactors is fed into a corresponding moving bed gasification reactor.

6. The method according to claim 1, wherein the pyrolysis reaction device comprises a fluidized bed pyrolysis reactor.

7. The method according to claim 1, wherein the pyrolysis reaction device comprises a moving bed pyrolysis reactor.

8. The method according to claim 1, wherein dry-ash-free basis volatile matter in the solid organic raw materials is present in a mass fraction of between 20 to 70%.

9. The method according to claim 1, further comprising adjusting the temperature of the pyrolysis reaction device by controlling the mixing ratio of the solid heat carrier to the solid organic raw materials in order to control a degree of pyrolysis of the solid organic raw materials.

10. The method according to claim 1, wherein in unit time, the mass ratio of the solid heat carrier fed into the pyrolysis reaction device to the solid organic raw materials is 2-7:1.

11. The method according to claim 1, wherein in unit time, a mass ratio of the solid heat carrier fed into the pyrolysis reaction device to the solid organic raw materials is 3-5:1.

12. The method according to claim 1, wherein the particle size of the solid organic raw materials is up to 8 mm.

13. The method according to claim 1, the particle size of the solid organic raw materials is less than 3 mm.

14. The method according to claim 1, wherein the pyrolysis reaction device has a temperature from 400 to 800° C.

15. The method according to claim 1, wherein the pyrolysis reaction device has a temperature from 500 to 700° C.

16. The method according to claim 1, wherein the moving bed gasification reaction device has a temperature from 700 to 950° C.

17. The method according to claim 1, wherein the moving bed gasification reaction device has a temperature from 800 to 950° C.

18. The method according to claim 1, wherein the temperature at which gasification is performed is adjusted by controlling the temperature and a circulation rate of a solid heat carrier which is fed into the moving bed gasification reaction device.

19. The method according to claim 1, wherein particles of the solid heat carrier form a moving layer in the moving bed gasification reaction device.

20. The method according to claim 19, wherein a mixture of the gaseous product generated from pyrolysis in the pyrolysis reaction device and the steam contacts with the moving layer in a contact mode selected from a group consisting of parallel current, counter current, radically cross current, or combinations of the above gas-solid contact and flow modes.

21. The method according to claim 20, wherein when nickel-based or iron-based catalyst is used as the solid heat carrier, the mixture of the gaseous products generated from pyrolysis and the steam contacts with the moving layer in a contact mode of counter current or radically cross current.

22. The method according to claim 1, wherein the solid heat carrier is simultaneously used as a catalyst for the gasification and as the heating medium for gasification.

23. The method according to claim 22, wherein the solid heat carrier is an olivine, olivine-supported nickel-based catalyst, olivine-supported iron-based catalyst, nickel-based perovskite catalyst, commercial nickel-based catalyst, solid product generated from pyrolysis of the solid organic raw materials, or combinations thereof.

24. The method according to claim 1, wherein calcium oxide is used as carbon dioxide absorbent, desulfurizer and solid heat carrier for gasification, wherein the gasification is performed at a temperature of 700 to 750° C. to prepare gaseous product with high hydrogen concentration.

25. The method according to claim 1, wherein the steam for gasification is fed from a lower portion of the solid material layer in the pyrolysis reaction device.

26. The method according to claim 1, wherein the solid heat carrier in the moving bed gasification reaction device is simultaneously used as a particle filter material and as the heating medium in order to capture dust entrained in the gaseous product of pyrolysis.

27. The method according to claim 1, wherein the riser and combustion reactor is equipped with a hot air inlet.

28. The method according to claim 27, wherein
a secondary reaction of the gaseous product generated from pyrolysis of the solid organic raw materials occurs in the pyrolysis reaction device to form carbon deposit on the surface of the solid heat carrier;
solid product generated from pyrolysis when leaving the pyrolysis reaction device forms a mixture with the solid heat carrier which bears the carbon deposit, wherein the mixture joins the solid heat carrier exiting from the moving bed gasification reaction device together with the captured dust in the riser and combustion reactor, and is rapidly fluidized and raised by hot air, wherein, during rising, carbon residue in the solid product generated from pyrolysis and the carbon deposit are burned to provide heat, such that the solid heat carrier is heated and regenerated.

29. The method according to claim 28, wherein an inlet temperature of the hot air entering into the riser and combustion reactor is configured to ensure the combustion of the carbon residue and the carbon deposit.

30. The method according to claim 28, wherein an inlet temperature of the hot air is higher than 400° C.

31. The method according to claim 1, wherein the solid heat carrier is heated to a temperature between 800 to 1100° C. in the riser and combustion reactor.

32. The method according to claim 1, wherein in the riser and combustion reactor, the solid heat carrier has a temperature lower than a melting temperature of ash content of the solid product generated from pyrolysis.

33. The method according to claim 1, wherein an inlet for replenishing the solid heat carrier is configured at a lower portion of the riser and combustion reactor.

34. The method according to claim 1, wherein an inlet for replenishing auxiliary fuel is configured at a lower portion of the riser and combustion reactor, wherein the auxiliary fuel is used for one or both of the following purposes:
(1) the auxiliary fuel is used for igniting and starting operations of the whole system;
(2) the auxiliary fuel is combusted to replenish heat if the solid product generated from pyrolysis of the solid organic raw materials has a low yield of carbon residue such that combustion of carbon residue in the riser and combustion reactor is insufficient to provide desired heat.

35. The method according to claim 1, wherein carbon deposit and solid product comprising carbon residue are generated from pyrolysis of the solid organics, and wherein the carbon residue and the carbon deposit are then burnt in the riser and combustion reactor to provide heat for pyrolysis and gasification.

36. The method according to claim 35, wherein, if pyrolysis generates the carbon residue in a low yield such that the combustion of the carbon residue in the riser and combustion reactor is insufficient to provide desired heat for pyrolysis and gasification, then components of the solid organic raw materials fed into the pyrolysis reaction device—which generates solid product with higher yield of carbon residue—is added, or other solid organic raw materials—which generates solid product with higher yield of carbon residue by pyrolysis—are added, so as to increase yield of carbon residue in the solid product of pyrolysis to provide sufficient heat.

37. The method according to claim 36, wherein other solid organic raw materials in the solid product of pyrolysis that generate solid product with higher yield of carbon residue by pyrolysis include petroleum coke.

38. The method according to claim 1, wherein the solid heat carrier is separated from dust-bearing hot flue gas in the solid heat carrier grading-dedusting device, and is divided into two parts in which one part has a smaller average particle size and the other part has a larger average particle size, wherein the separation is performed based on flow-rate difference of dust-bearing solid heat carrier due to differences in density of the solid particles with different particle sizes, inertia force of the solid particles with different particle sizes, or centrifugal force of the solid particles with different particle sizes, or combinations of two or three of above property differences.

39. The method according to claim 1, wherein a particle size grading of the solid heat carrier in the solid heat carrier grading-dedusting device is performed by means of mechanical sieving.

40. The method according to claim 1, wherein the solid heat carrier comprises particles of olivine, silica sand, corundum sand, calcined magnesite, high-temperature ceramic materials, mullite, zircon sand, iron sand, solid product generated from pyrolysis of the solid organic raw materials, or combinations thereof.

41. The method according to claim 1, wherein particles of the solid heat carrier have a particle size of up to 6 mm.

42. The method according to claim 1, wherein an operating pressure for each reaction device and reactor is atmospheric pressure.

43. The method according to claim 1, wherein in unit time, a mass ratio of the solid heat carrier entering into the moving bed gasification reaction device to the solid heat carrier entering into the pyrolysis reaction device is controlled in the range of 0.5 to 5.

* * * * *